United States Patent
Hu et al.

(10) Patent No.: US 11,234,248 B2
(45) Date of Patent: Jan. 25, 2022

(54) NETWORK ENTITY FOR FLEXIBLY MANAGING RADIO RESOURCES FOR USER EQUIPMENTS IN A D2D COMMUNICATION NETWORK

(71) Applicants: Huawei Technologies Co., Ltd., Shenzhen (CN); VOLKSWAGEN AKTIENGESELLSCHAFT, Wolfsburg (DE)

(72) Inventors: Liang Hu, Shenzhen (CN); Markus Martin Dillinger, Munich (DE); Josef Eichinger, Munich (DE); Roman Alieiev, Stendal (DE); Thorsten Hehn, Wolfsburg (DE); Andreas Kwoczek, Lehre (DE)

(73) Assignees: Huawei Technologies Co., Ltd., Shenzhen (CN); Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 16/548,646

(22) Filed: Aug. 22, 2019

(65) Prior Publication Data
US 2019/0380132 A1    Dec. 12, 2019

Related U.S. Application Data

(63) Continuation of application No. PCT/EP2017/054169, filed on Feb. 23, 2017.

(51) Int. Cl.
*H04W 72/04* (2009.01)
*H04W 72/08* (2009.01)
(Continued)

(52) U.S. Cl.
CPC .......... *H04W 72/085* (2013.01); *H04W 4/46* (2018.02); *H04W 4/70* (2018.02); *H04W 80/12* (2013.01)

(58) Field of Classification Search
CPC ....... H04W 72/085; H04W 4/46; H04W 4/70; H04W 80/12; H04W 76/14
See application file for complete search history.

(56) References Cited

U.S. PATENT DOCUMENTS 9,008,696 B1    4/2015  Beattie et al.
10,701,581 B2 *  6/2020  Seo ...................... H04W 24/10
(Continued)

FOREIGN PATENT DOCUMENTS

CN    105246025 A    1/2016
CN    106465209 B    9/2020
(Continued)

OTHER PUBLICATIONS

"3rd Generation Partnership Project; Technical Specification Group Radio Access Network; Study on LTE-based V2X Services; (Release 14)," 3GPP TR 36.885, V14.0.0, pp. 1-216, 3rd Generation Partnership Project, Valbonne, France (Jun. 2016).
(Continued)

*Primary Examiner* — Hassan Kizou
*Assistant Examiner* — Mahbubul Bar Chowdhury
(74) *Attorney, Agent, or Firm* — Leydig, Voit & Mayer, Ltd.

(57) ABSTRACT

A network entity for flexibly managing radio resources for a plurality of user equipment in a communication network is provided. The network entity includes: a communication interface configured to communicate with a user equipment of the plurality of user equipment; and a processor configured to obtain a communication quality measure associated with the communication between the network entity and the user equipment and to select a radio resource management mode for the user equipment on the basis of the communication quality measure.

14 Claims, 10 Drawing Sheets

(51) Int. Cl.
*H04W 4/46* (2018.01)
*H04W 4/70* (2018.01)
*H04W 80/12* (2009.01)

(56) References Cited

U.S. PATENT DOCUMENTS

| | | | |
|---|---|---|---|
| 2012/0224546 | A1 | 9/2012 | Chang et al. |
| 2014/0376458 | A1 | 12/2014 | Ryu et al. |
| 2015/0215767 | A1 | 7/2015 | Siomina et al. |
| 2015/0245397 | A1 | 8/2015 | Sachs et al. |
| 2016/0323922 | A1* | 11/2016 | Park ................ H04W 76/14 |
| 2017/0230938 | A1* | 8/2017 | Huang ............... H04W 72/02 |
| 2018/0103460 | A1* | 4/2018 | Sharma ............. H04W 72/14 |
| 2018/0227882 | A1* | 8/2018 | Freda .............. H04W 72/085 |
| 2019/0141573 | A1* | 5/2019 | Bostrom ............. H04W 4/40 |

FOREIGN PATENT DOCUMENTS

| | | |
|---|---|---|
| EP | 3122135 A1 | 1/2017 |
| EP | 3179792 A1 | 6/2017 |
| WO | 2014054986 A1 | 4/2014 |
| WO | 2014200307 A1 | 12/2014 |
| WO | 2015173632 A1 | 11/2015 |
| WO | 2016019691 A1 | 2/2016 |
| WO | 2017027355 A1 | 2/2017 |

OTHER PUBLICATIONS

"3rd Generation Partnership Project; Technical Specification Group Radio Access Network; Evolved Universal Terrestrial Radio Access (E-UTRA); Physical Layer Procedures (Release 14)," 3GPP TS 36.213, V14.1.0, pp. 1-414, 3rd Generation Partnership Project, Valbonne, France (Dec. 2016).

KR/10-2019-7027727, Office Action, dated Oct. 20, 2020.

"3rd Generation Partnership Project; Technical Specification Group Radio Access Network; Study on LTE-based V2X Services; (Release 14)," 3GPP TR 36.885 V2.0.0, total 220 pages, 3rd Generation Partnership Project, Valbonne, France (Jun. 2016).

"Design considerations on LTE-V2V coexistence with DSRC technology," 3GPP TSG RAN WG1 Meeting #86bis, Lisbon, Portugal, R1-1609458, total 7 pages, 3rd Generation Partnership Project, Valbonne, France (Oct. 10-14, 2016).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 V14.1 0, total 317 pages, 3rd Generation Partnership Project, Valbonne, France (Dec. 2016).

Huawei, HiSilicon, "Coexistence of 802.11p and V2V services," 3GPP TSG RAN WG1 Meeting #86bis, Lisbon, Portugal, R1-1608594, total 3 pages, 3rd Generation Partnership Project, Valbonne, France (Oct. 10-14, 2016).

* cited by examiner

NETWORK ENTITY FOR FLEXIBLY MANAGING RADIO RESOURCES FOR USER EQUIPMENTS IN A D2D COMMUNICATION NETWORK

CROSS REFERENCE TO RELATED APPLICATIONS

This application is a continuation of International Application No. PCT/EP2017/054169, filed on Feb. 23, 2017, the disclosure of which is hereby incorporated by reference in its entirety.

STATEMENT OF JOINT RESEARCH AGREEMENT

The subject matter and the claimed invention were made by or on the behalf of The Volkswagen Aktiengesellschaft, of Berliner Ring2, D-38444 Wolfsburg, Germany and Huawei Technologies Co., Ltd., of Shenzhen, Guangdong Province, P.R. China, under a joint research agreement titled "Technical Annex to the Research Cooperation V2X Communication with 5G and Beyond". The joint research agreement was in effect on or before the claimed invention was made, and that the claimed invention was made as a result of activities undertaken within the scope of the joint research agreement.

TECHNICAL FIELD

In general, embodiments of the present invention relate to the field of wireless D2D (device-to-device) communications. More specifically, embodiments of the present invention relate to a network entity for flexibly managing radio resources for user equipment in a D2D communication network.

BACKGROUND

The growing interest in applications of wireless technologies to vehicular environments leads to developments of technologies and protocols for data transmission between vehicles collectively referred to as device-to-device (D2D) communication or alternatively V2V (vehicle-to-vehicle) communication. Emerging communication services, such as traffic safety, real-time remote monitoring, control of critical infrastructure and industrial autonomous control, raise new challenges for D2D radio networks.

Figure 1A:
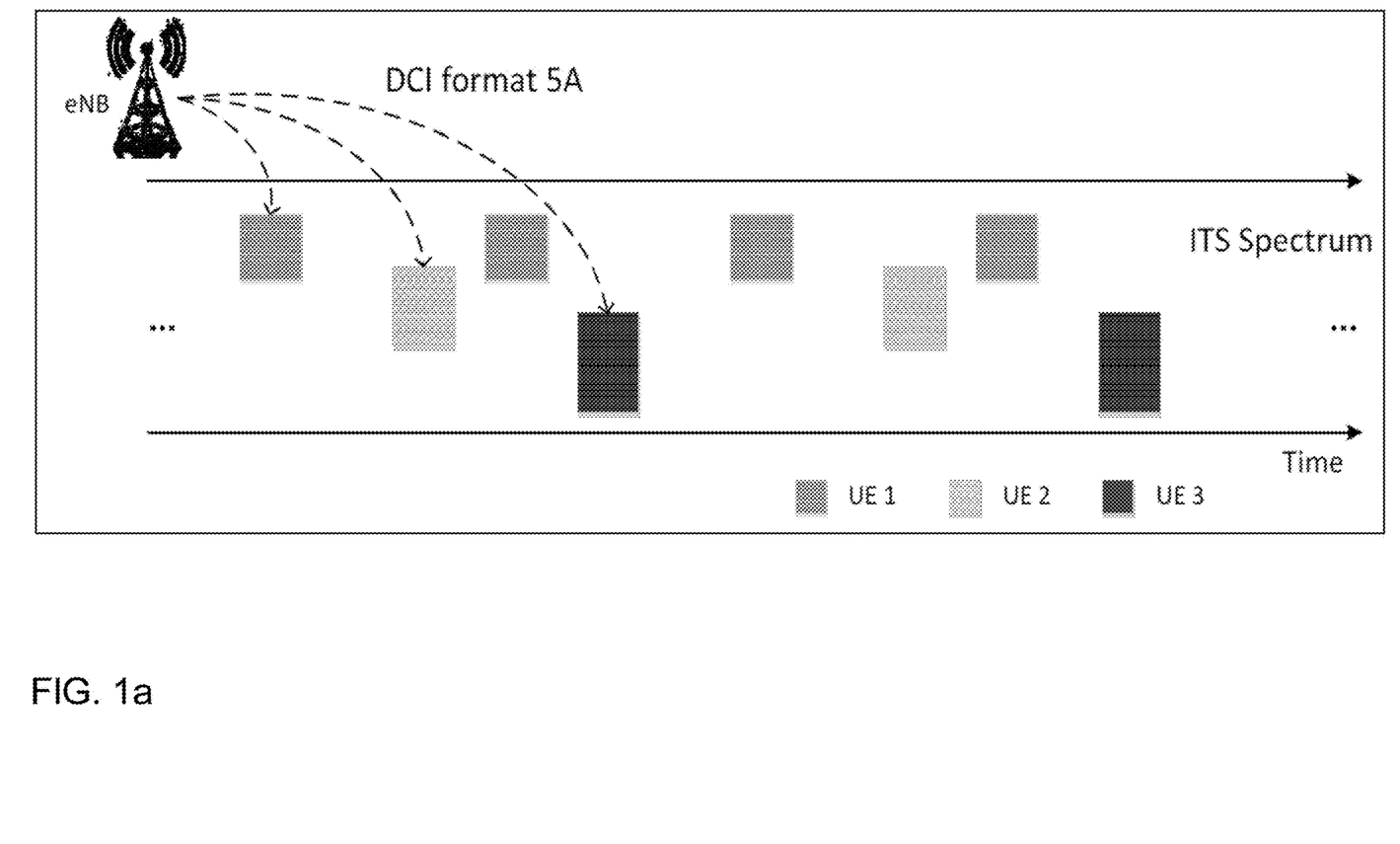
FIG. 1a shows a schematic diagram illustrating a first conventional radio management resource mode in a D2D communication network.
Figure 1B:
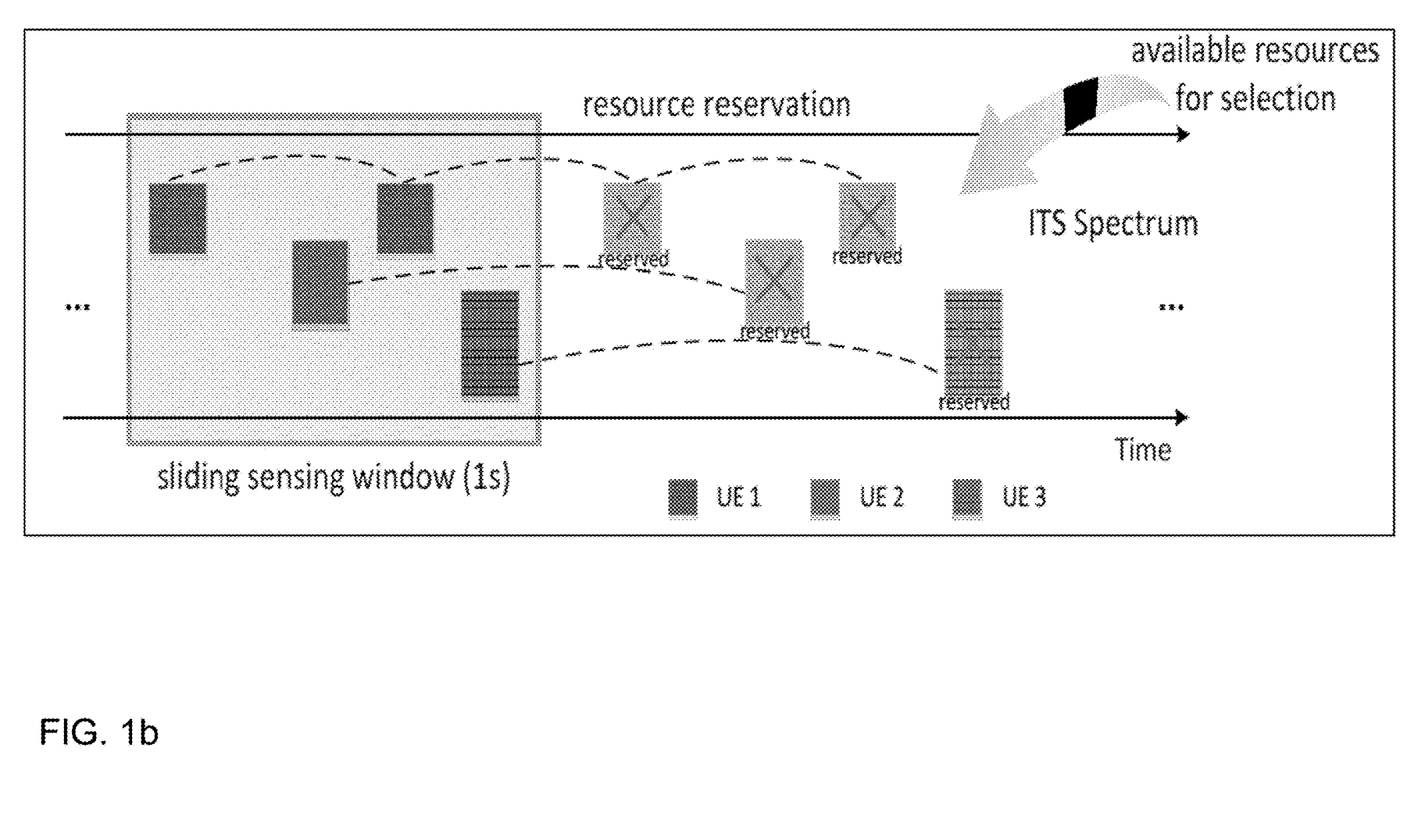
FIG. 1b shows a schematic diagram illustrating a second conventional radio management resource mode in a D2D communication network.

In the technical report 3GPP LTE-V2X 3GPP 36.885, the following two resource allocation modes have been proposed for D2D communication networks. In a first mode (herein also referred to as mode 1), an evolved node B (eNB) allocates radio resources for each user equipment (UE) via the new DCI format 5A as shown in FIG. 1a. The eNB can perform a semi-persistent allocation for each UE and can also leverage the reported location information of the UE for optimizing the resource allocation. In a second mode (herein also referred to as mode 2) each UE autonomously selects its radio resources based on the defined sensing protocol in the technical report mentioned above as shown in FIG. 1b. The UE can perform semi-persistent allocation and can also leverage resource reservation information of neighboring UEs for optimizing the resource allocation.

Mode 1 has the following disadvantages:

Firstly, mode 1 requires network coverage by one or more eNBs. In particular, in the initial deployment phase of cellular V2V, not all eNB will have the cellular V2V capability, thus there will be areas where mode 1 cannot work.

Secondly, the mode 1 leads to a high signaling overhead and latency for multi-operator RRM (radio resource management) coordination. In a multi-operator scenario, i.e. when the RRM of a UE is controlled by multiple different operators, the coordination among operators become essential to mitigate any V2V interferences among different operators in a shared V2V spectrum. However, this will lead to a high signaling overhead necessary for exchanging RRM control information among operators. Moreover, the potential large latency caused by communications between operators may severely hamper the performance of mode 1.

Thirdly, mode 1 can lead to a high UE-to-UTRAN (Uu) signaling overhead for eNB scheduling request and response when the node density or the traffic demand per node is high. This is because mode 1 requires the UE to report its location information to the eNB and the eNB to allocate radio resources for each UE via DCI format 5A in the downlink. While the performance of mode 1 is superior to the performance of mode 2, there is a cost of high signaling overhead.

Mode 2 has the following disadvantages:

Firstly, mode 2 is less reliable due to a distributed resource selection. This is because resource selection collisions among different UEs are highly possible in a high UE density scenario, where the local observations of empty radio resource by UEs may be highly correlated.

Secondly, mode 2 provides less control possibilities for a mobile automotive operator. Being a fully autonomous decision at the UE, mode 2 allows limited room for mobile automotive operator to optimize the V2V communications and services, even if a mobile automotive operator is able to do it better via its collected rich information about UEs.

In light of the above disadvantages of mode 1 and mode 2, there is still a need for improved devices and methods for flexibly managing radio resources in a D2D communication network, especially in the initial V2V service deployment phase where the mode 1 capability of base stations may not be available.

SUMMARY

It is an object of the invention to provide improved devices and methods for managing radio resources in a D2D communication network.

The foregoing and other objects are achieved by the subject matter of the independent claims. Further implementation forms are apparent from the dependent claims, the description and the figures.

According to a first aspect, embodiments of the invention relate to a network entity for flexibly managing radio resources for a plurality of user equipment in a communication network, the network entity comprising: a communication interface configured to communicate with a user equipment of the plurality of user equipment; and a processor configured to obtain a communication quality measure associated with the communication between the network entity and the user equipment and to select a radio resource management mode for managing radio resources for the user equipment on the basis of the communication quality measure.

In an implementation form, the network entity is a V2V cloud server. In an implementation form, the radio resources are radio resources for D2D communication. In an implementation form, the communication quality measure comprises a network latency measure associated with the network latency between the network entity and the user equipment and/or a communication reliability measure associated with the communication between the network entity and the user equipment. In an implementation form, the latency measure can be the latency of a message from the network entity to the user equipment or vice versa. In an implementation form, the latency can be determined on the basis of a time stamp of an IP packet at the network layer. In an implementation form, the communication reliability measure can be determined on the basis of a successful packet delivery ratio between the network entity and the user equipment before a certain latency deadline.

Thus, an improved network entity for managing radio resources in a D2D communication network is provided. The network entity according to the first aspect allows implementing a mobile automotive operator (MAO) based resource allocation scheme to improve existing allocation schemes, such as 3GPP cellular V2V RRM mode 2 described above (Ad-Hoc) or 802.11p, in particular in terms of minimizing the multi-user interference. Moreover, the network entity according to the first aspect provides a flexible extension for eNB based V2V RRM schemes, such as mode 1 described above, where some of the eNB controlled RRM functions can be flexibly moved to back-end server.

In a first possible implementation form of the network entity according to the first aspect as such, the processer is further configured to inform the user equipment via the communication interface about the selected radio resource management mode.

In a second possible implementation form of the network entity according to the first aspect as such or the first implementation form thereof, the processor is further configured to allocate radio resources of the communication network for the user equipment on the basis of the selected radio resource management mode using a resource allocation response message transmitted via the communication interface to the user equipment.

In a third possible implementation form of the network entity according to the second implementation form of the first aspect, the resource allocation response message comprises one or more of the following message fields: resource subpool ID, timer validity for a subpool, synchronization reference configuration for a subpool, UE transmission power level for a subpool, semi-persistent scheduling IDs for each user equipment.

In a fourth possible implementation form of the network entity according to the second or third implementation form of the first aspect, the processor is configured to allocate the radio resources of the communication network for the user equipment on the basis of the selected radio resource management mode in response to a resource allocation request message received from the user equipment.

In a fifth possible implementation form of the network entity according to the fourth implementation form of the first aspect, the resource allocation request message comprises one or more of the following message fields: user equipment location, user equipment speed, user equipment moving direction, user equipment buffer status report, user equipment sidelink channel quality information, radio resource context information provided by a base station in communication with the user equipment. In an implementation form the radio resource context information comprises a resource pool busy ratio based on a resource pool consisting of multiple resource blocks. The busy ratio of the resource pool can be measured by the number of occupied resource blocks divided by the total number of resource blocks in the pool. To determine the number of occupied resource blocks, the measurement of a sidelink RSRP (reference signal received power) can be used, For instance, if the RSRP value is larger than a threshold, the corresponding resource block can be considered to be occupied.

In a sixth possible implementation form of the network entity according to any one of the second to fifth implementation form of the first aspect, the processor is configured to allocate the radio resources of the communication network for the user equipment by assigning the user equipment to a subpool of radio resources.

In a seventh possible implementation form of the network entity according to the first aspect as such or any one of the first to sixth implementation form thereof, the processor is configured to select on the basis of the communication quality measure a first radio resource management mode or a second radio resource management mode, wherein in the first radio resource management mode radio resources of the user equipment are allocated by the network entity and in the second radio resource management mode radio resources of the user equipment are allocated by a base station of the communication network in communication with the user equipment.

In an eight possible implementation form of the network entity according to the seventh implementation form of the first aspect, the processor is configured to select on the basis of the communication quality measure the first radio resource management mode for the user equipment and on the basis of a further communication quality measure associated with the network latency between the network entity and a further user equipment of the plurality of user equipment the second radio resource management mode for the further user equipment.

According to a second aspect, embodiments of the invention relate to a corresponding method of operating a network entity for managing radio resources of a plurality of user equipment in a communication network, the method comprising: obtaining a communication quality measure associated with the communication quality between the network entity and the user equipment; and selecting a radio resource management mode for the user equipment on the basis of the communication quality measure. In an implementation form, the communication quality measure comprises a network latency measure associated with the network latency between the network entity and the user equipment and/or a communication reliability measure associated with the communication between the network entity and the user equipment.

Thus, an improved method of operating a network entity for managing radio resources in a D2D communication network is provided.

According to a third aspect, embodiments of the invention relate to a user equipment configured for device-to-device communications with a plurality of user equipment in a communication network using a plurality of radio resources, the user equipment comprising: a communication interface configured to receive information from a network entity of the communication network about radio resources of the communication network, which have been allocated to the user equipment by the network entity based on a radio resource management mode selected by the network entity on the basis of a communication quality measure associated with the communication between the network entity and the user equipment; and a processor configured to select a context information feedback mode on the basis of the selected radio resource management mode. In an implementation form, the communication quality measure comprises a network latency measure associated with the network latency between the network entity and the user equipment and/or a communication reliability measure associated with the communication between the network entity and the user equipment.

In a first possible implementation form of the user equipment according to the third aspect as such, the processor is configured to send, in response to the information about the radio resource management mode selected by the network entity, a resource allocation request message to the network entity.

In a second possible implementation form of the user equipment according to the first implementation form of the third aspect, depending on the selected context information feedback mode, the resource allocation request message comprises one or more of the following message fields: user equipment location, user equipment speed, user equipment moving direction, user equipment buffer status report, user equipment sidelink channel quality information, radio resource context information provided by a base station in communication with the user equipment.

In a third possible implementation form of the user equipment according to the first or second implementation form of the third aspect, the processor is configured to implement a protocol stack comprising an application layer and a radio layer, wherein the application layer is configured to forward the information from the network entity about the radio resources of the communication network, which have been allocated to the user equipment by the network entity, to the radio layer.

In a fourth possible implementation form of the user equipment according to the third implementation form of the third aspect, the radio layer is configured to forward information for the resource allocation request message to the application layer.

According to a fourth aspect, embodiments of the invention relate to a corresponding method of operating a user equipment configured for device-to-device communications with a plurality of user equipment, in a communication network using a plurality of radio resources, the method comprising: receiving information from a network entity of the communication network about radio resources of the communication network, which have been allocated to the user equipment by the network entity based on a radio resource management mode selected by the network entity on the basis of a communication quality measure associated with the communication between the network entity and the user equipment; and selecting a context information feedback mode on the basis of the selected radio resource management mode.

According to a fifth aspect, embodiments of the invention relate to a computer program comprising program code for performing the method of the second aspect or the method according to the fourth aspect when executed on a computer.

Embodiments of the invention can be implemented in hardware and/or software.

Embodiments of the invention provide the following advantages. Embodiments of the invention provide essential building blocks for V2X RRM in the initial phase of cellular V2X deployment, when existing eNBs are not upgraded with Cellular V2X features and when 802.11p is suboptimal. Embodiments of the invention can improve the reliability of cellular-V2X Mode 2 or 802.11p RRM method, which is very essential for the initial deployment of cellular V2X services, where many eNBs are not upgraded with V2X capability.

As an operator agnostic RRM solution, embodiments of the invention naturally solve the problem of multi-operator issues for V2X where both the business model and multi-operator resource allocation are still challenging. Embodiments of the invention provide enablers for mobile automotive operators to directly optimize their services as a flexible extension to the mobile operator controlled V2X with the following additional advantages. Embodiments of the invention relieve the burden of mobile operator to control V2X (using its precious resources). Embodiments of the invention provide low-overhead direct control of the V2X services for car makers. Embodiments of the invention can significantly improve the reliability of mode 2 V2V RRM by leveraging UE context information through tunneling at facility layer and MAC/PHY layer. Embodiments of the invention can especially optimize the mode 2 cellular V2V or 802.11p RRM in full, partial and out-coverage scenarios, when eNB based RRM is not possible.

DESCRIPTION OF DRAWINGS

Further embodiments of the invention will be described with respect to the following figures, wherein.

In the various figures, identical reference signs will be used for identical or at least functionally equivalent features.

DESCRIPTION OF EMBODIMENTS

In the following description, reference is made to the accompanying drawings, which form part of the disclosure, and in which are shown, by way of illustration, specific aspects in which the present invention may be placed. It will be appreciated that other aspects may be utilized and structural or logical changes may be made without departing from the scope of the present invention. The following detailed description, therefore, is not to be taken in a limiting sense, as the scope of the present invention is defined by the appended claims.

For instance, it will be appreciated that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures.

Moreover, in the following detailed description as well as in the claims embodiments with different functional blocks or processing units are described, which are connected with each other or exchange signals. It will be appreciated that the present invention covers embodiments as well, which include additional functional blocks or processing units that are arranged between the functional blocks or processing units of the embodiments described below.

Finally, it is understood that the features of the various exemplary aspects described herein may be combined with each other, unless specifically noted otherwise.

Figure 2:
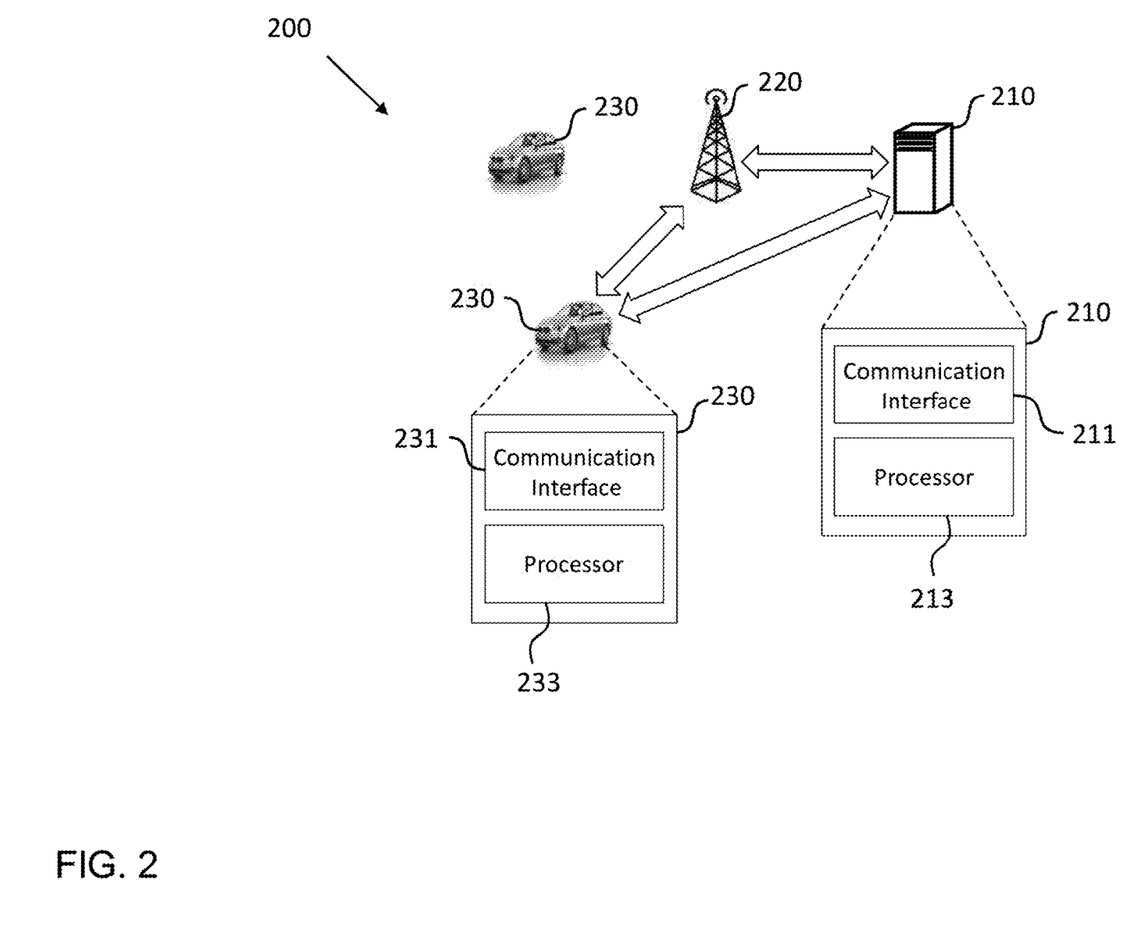
FIG. 2 shows a schematic diagram illustrating a D2D communication network comprising a network entity according to an embodiment and a user equipment according to an embodiment.

FIG. 2 shows a schematic diagram illustrating a D2D communication network 200 comprising a network entity 210 according to an embodiment and a plurality of user equipment 230 according to an embodiment. The plurality of user equipment 230 are configured to communicate with each other, either via a sidelink communication channel and/or via an uplink/downlink communication channel provided by a cellular base station 220. In the embodiment shown in FIG. 2 the plurality of user equipment 230 are implemented in the form of cars or a communication module of a car. However, it will be appreciated that embodiments of the invention apply to user equipment other than cars as well.

The network entity 210, which in an embodiment can be implemented as a V2V cloud server, is configured to manage radio resources of the D2D communication network 200 for the plurality of user equipment 230. As can be taken from the detailed view shown in FIG. 2, the network entity 210 comprises a communication interface 211 and a processor 213.

The communication interface 211 of the network entity 210 is configured to communicate with the plurality of user equipment 230. In an embodiment, the communication between the network entity 210 and the user equipment 230 is an IP based communication.

The processor 213 of the network entity 210 is configured to obtain a communication quality measure, e.g. a communication quality measure value, associated with the communication between the network entity 210 and the user equipment 230 and to select a radio resource management mode for the user equipment 230 on the basis of the communication quality measure.

In an embodiment, the communication quality measure comprises a network latency measure associated with the network latency between the network entity 210 and the user equipment 230 and/or a communication reliability measure associated with the communication between the network entity 210 and the user equipment 230. In an embodiment, the latency measure can be the latency of a message from the network entity 210 to the user equipment 230 or vice versa. In an embodiment, the latency can be determined on the basis of a time stamp of an IP packet at the network layer. In an embodiment, the communication reliability measure (value) can be determined on the basis of a packet delivery ratio between the network entity 210 and the user equipment 230.

In the following only one of the plurality of user equipment 230 will be described in more detail. As can be taken from the detailed view shown in FIG. 2, the user equipment 230 comprises a communication interface 231 and a processor 230.

The communication interface 231 of the user equipment 230 is configured to receive information from the network entity 210 about radio resources of the communication network 200, which have been allocated to the user equipment 230 by the network entity 210 based on a radio resource management mode selected by the network entity 210 on the basis of a communication quality measure associated with the communication between the network entity 210 and the user equipment 230.

The processor 233 of the user equipment is configured to select a context information feedback mode on the basis of the selected radio resource management mode, as will be described in more detail further below.

In the following further embodiments of the network entity 210 and the user equipment 230 will be described in more detail.

Figure 3:
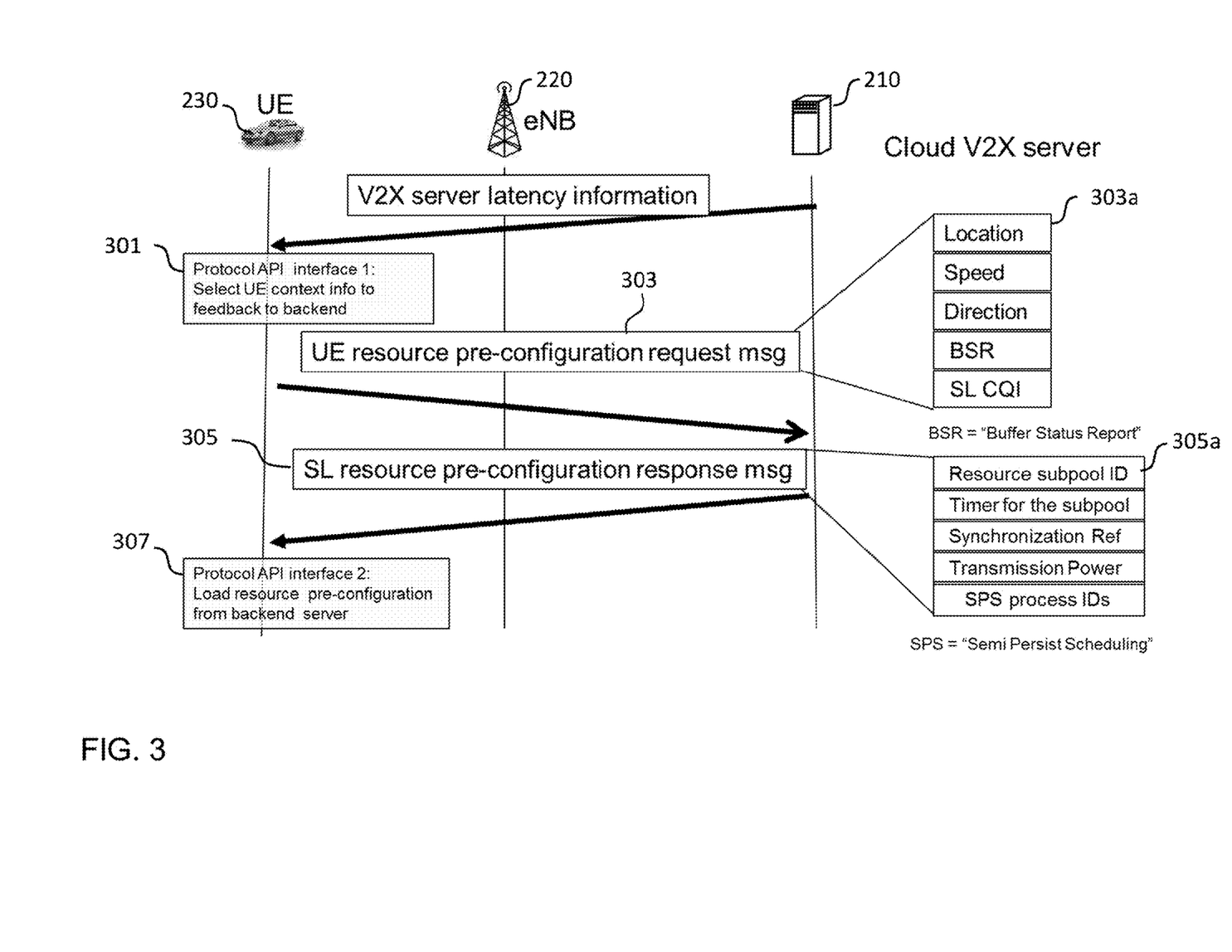
FIG. 3 shows a schematic diagram illustrating an interaction between a network entity according to an embodiment and a user equipment according to an embodiment.

FIG. 3 shows a schematic diagram illustrating an interaction between the network entity 210 according to an embodiment and the user equipment 230 according to an embodiment, where the communication quality measure comprises a network latency measure. Firstly, the V2V server 210 estimates the end-to-end latency to its serving UE 230 and decides which level of RRM function it could provide to the UE 230 by selecting a corresponding radio resource management mode for the UE 230 on the basis of the estimated latency. As will be appreciated, the latency will generally depend on where in the communication network 200 the V2X server 210 is physically located. If the V2X server 210 is implemented as part of the eNB 220, then it can perform fast RRM function such as scheduling/interference mitigation per UE 230. If it is located far in the network 200, then it can only perform large-time scale slow RRM functions, such as resource pool pre-configuration/subpooling. As a consequence of the set of RRM functions that the V2V server 210 can provide, the UE RRM related context information reporting shall be adjusted accordingly, e.g., sidelink channel quality information is not needed for large time scale RRM functions. Secondly, based on the V2X server latency information or the explicit command from the V2V backend server 210, the UE 230 loads/gets the selected UE RRM related context information from its radio layer and facilities layer to the application layer via a UE Protocol stack API interface. The UE 230 then reports those selected RRM related UE context information (in the resource pre-configuration request message) to the V2V backend server 210 via the application layer message exchanges. The UE resource pre-configuration request message 303a can include the following message fields: UE location, UE speed, UE moving direction, UE buffer status report, UE sidelink channel qualify information (based on sidelink references signal RSRQ measurements or based on decoding neighbor UEs' resource reservation messages). It could also include the resource configuration information from the parallel eNB's SL configuration information e.g., the Resource Pool Config from eNB UL, Resource Pool Config from mode 1 V2V RRM. Thirdly, the V2V back-end server 210 performs resource pre-configuration for different groups of UEs 230 or allocates resources for each UE 230. One embodiment for resource pre-configuration for different groups of UEs will be described in the context of FIG. 4 in more detail below. Then, the V2V back-end server 210 sends the application layer SL resource pre-configuration response message 305a to each UE 230, which can include the following message fields: Resource subpool ID, Timer validity for the subpool, Synchronization reference configuration for each subpool, UE transmission power level for each subpool, Semi Persist Scheduling (SPS) IDs for each UE. In the last step 307, once the UE 230 obtains the resource pre-configuration response message 305a from the V2V backend server 210, it sends this message information in the application layer to its radio layer which is responsible for performing RRM functions, via the UE protocol stack API signaling. Those API information exchanges will be described in more detail in the context of FIG. 5 below.

Figure 4:
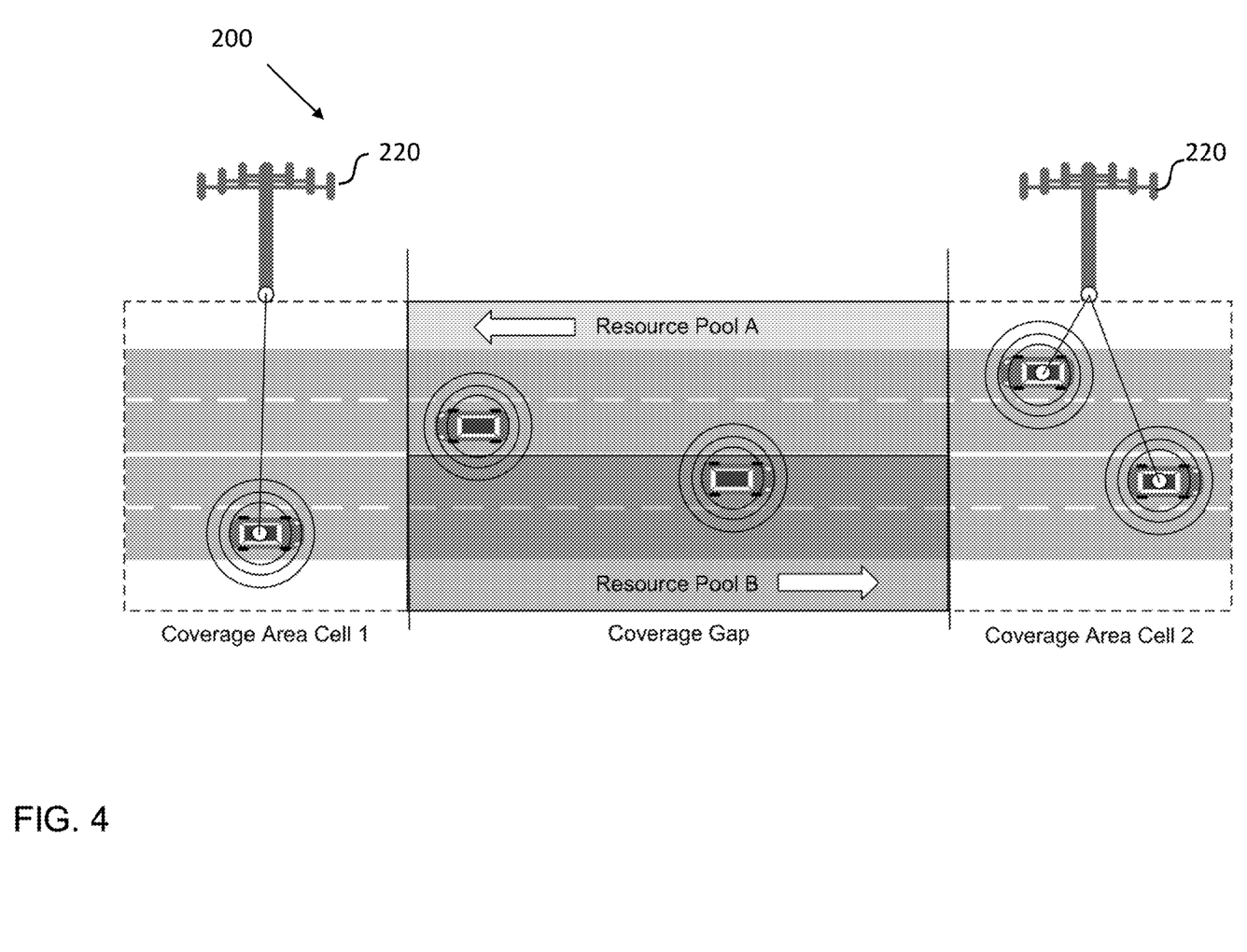
FIG. 4 shows a schematic diagram illustrating the allocation of resources implemented in a network entity according to an embodiment.

FIG. 4 shows a schematic diagram illustrating the allocation of resources implemented in the network entity 210 according to an embodiment. More specifically, FIG. 4 shows an example for SL resources pre-configuration at the V2X backend server 210. In an embodiment, it is possible for the V2X backend server 210 to anticipate cellular-coverage gaps along the service area in order to provide an adequate allocation of sub-pools to the UEs 230 which are about to exit the network coverage for sufficient data rates. In an embodiment, these UEs 230 can download from the backend server 210 the configuration in advance and operate in accordance therewith, while travelling along the cellular-coverage gap. As can be taken from FIG. 5, the cars located in the opposite two lanes can be pre-configured with two different subpools, i.e., Resource Pool A and B, to mitigate the strong interferences from the UEs 230 driving in opposite directions. After the sub-pooling, the UEs 230 can perform RRM mode 2 within the allocated subpool. In an embodiment, the subpools are location-based pre-configured, i.e. two close locations use two different subpools.

One embodiment of a resource configuration algorithm implemented in the network entity 210 can be as follows. A set of radio resource blocks in the time and frequency domain referred to as RB in a resource pool can be divided into four different subpools RB1, RB2, RB3 and RB4 corresponding respectively to driving direction west at more than 100 km/h, driving direction west at less than 100 km/h, driving direction east at more than 100 km/h and driving direction east at less than 100 km/h. The V2X backend server 210 obtains the driving directions of its specific coverage area from the known road traffic information. The UEs 230 are also grouped into four categories by the driving directions and speed. The number of radio resource blocks in each one of the subpools can be proportional to the density of UEs 230 within each category, D1, D2, D3 and D4. The V2X backend server 210 can obtain the D1, D2, D3 and D4 from the context information report by the UEs 230. In an embodiment, the number of resources allocated to each category of UEs 230 can be computed as:

$$|RB_i| = D_i \times |RB|$$

wherein RB denotes the total number of resource blocks, RBi denotes the number of resource blocks assigned to the category and Di denotes the density of vehicles/UEs 230 within a category. In this manner, a UE 230 assigned to the category D1 will try first to select a free resource block within RB1, and in case all resources are occupied, it will move to RB2, RB3 and RB4 (in this order).

Figure 5:
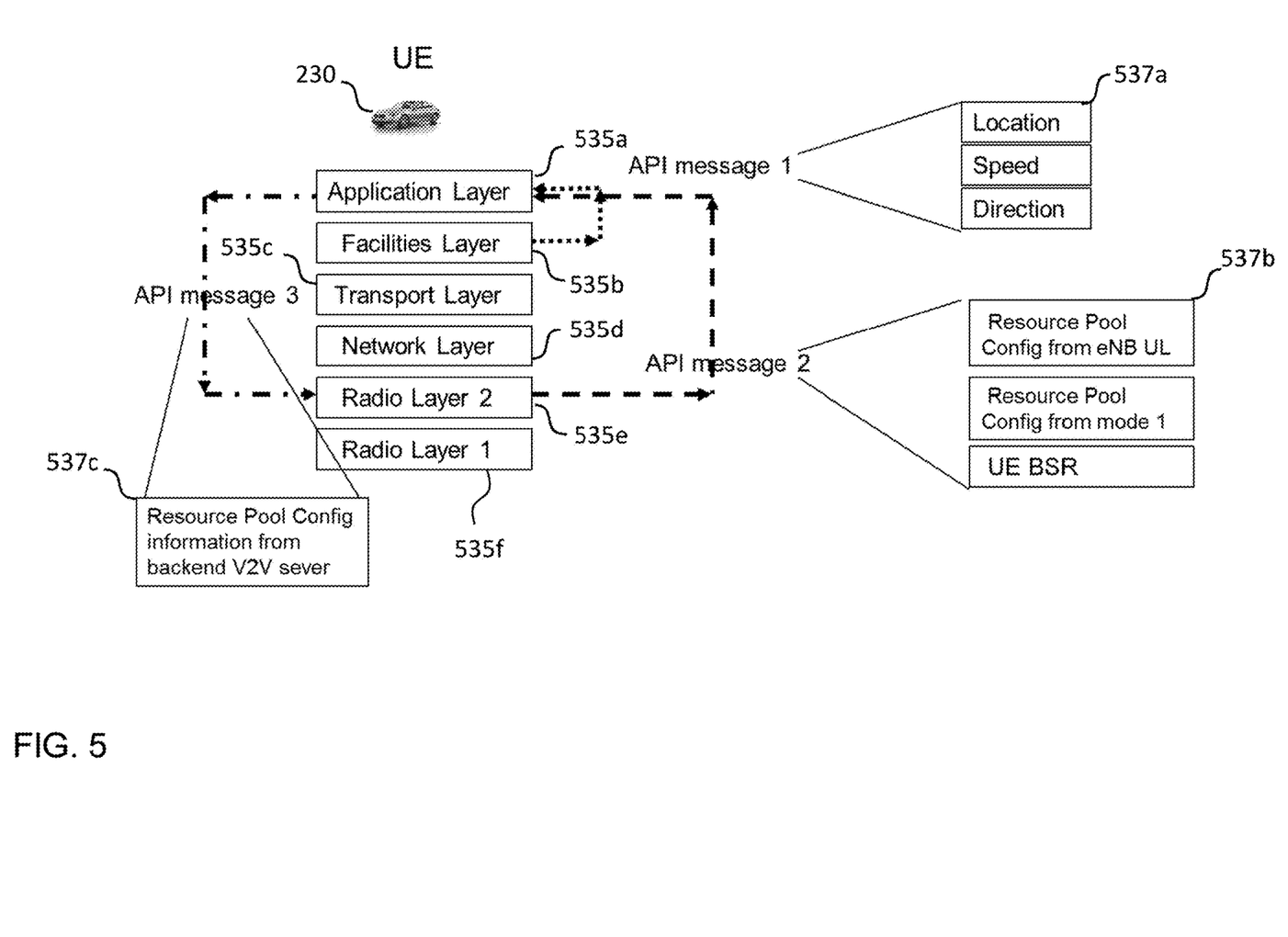
FIG. 5 shows a schematic diagram illustrating a protocol stack implemented in a user equipment according to an embodiment.

FIG. 5 shows a schematic diagram illustrating a protocol stack implemented in the user equipment 230 according to an embodiment. More specifically, FIG. 5 shows API interface messages between the facilities, radio and application layers of a protocol stack implemented in the UE 230 according to an embodiment. API message 1, which is indicated by dotted arrows in FIG. 5, is configured to signal the UE location, speed and moving direction information from the ITS CAM (context awareness) message stored at the facilities layer 535b to the application layer 535a. API message 2, which is indicated by dashed arrows in FIG. 5, is configured to signal the radio layer (MAC and PHY layer) UE context information to the application layer 535a, where the Resource Pool Config from eNB UL, Resource Pool Config from mode 1 V2V RRM, UE BSR, and possibly SL channel quality information are included. API message 3, which is indicated by dotted-dashed arrows in FIG. 5, is configured to forward the information from the network entity 210 about the radio resources of the communication network 200, which have been allocated to the user equipment 230 by the network entity 210, to the radio layer 535e, 535f, as already described above.

Figure 6:
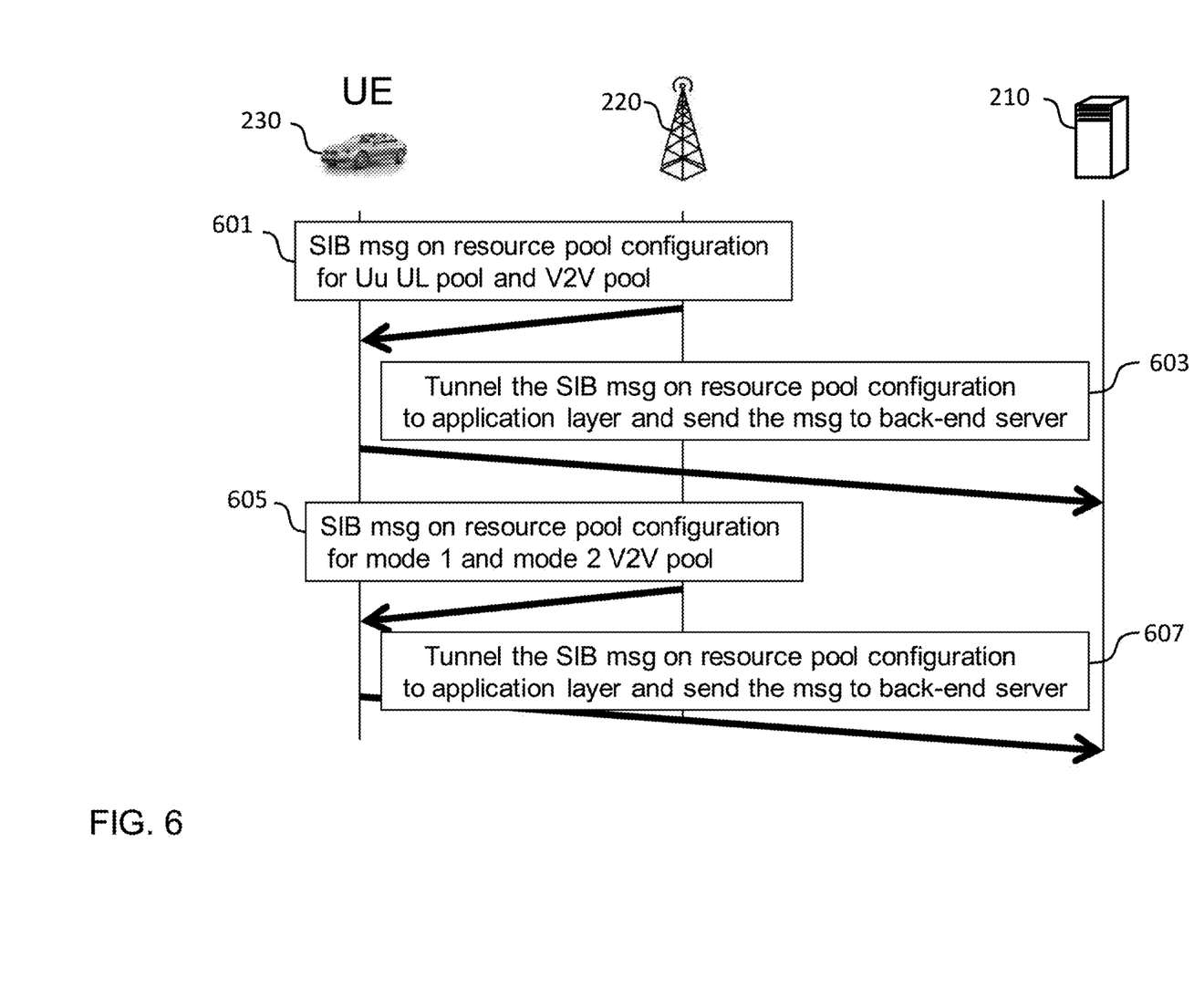
FIG. 6 shows a schematic diagram illustrating an interaction between a network entity according to an embodiment and a user equipment according to an embodiment.

FIG. 6 shows a schematic diagram illustrating a further interaction between the network entity 210 according to an embodiment and the user equipment 230 according to an embodiment. More specifically, FIG. 6 shows the new signaling message between the UE 230 and the backend server 210 for the coexistence of mode 2 and mode 1 in different pools, i.e. the coexistence of V2V and Uu UL in a shared pool. At the radio layer (MAC/PHY layer), the UE 230 receives the SIB message on resource pool configuration for the Uu interface UL (cellular uplink) pool and the V2V resource pool. Via the protocol stack API, the UE 230 signals the radio layer received SIB message on eNB resource pool configuration to the application layer and then sends the message to V2V back-end server 210 (see block 603). Then, the V2V backend server 210 could solve the potential resource allocation conflicts with the eNB based resource allocation. There are two options.

When the V2V backend server based RRM has higher priority, the UE 230 will prioritize the resource allocation command from the V2V backend server 210, and inform the eNB 220 about the resource configuration/allocation from the V2V server 210 (via the Uu interface UL control signalling or RRC signaling). Then, the eNB 220 shall adapt its resource configuration to V2V server's resource configuration.

When the V2V backend server based RRM has lower priority, the V2V backend server 210 should avoid the conflicts with the resource configuration from the eNB 220 and allocate/conFIGthe SL resource to the UE 230 on the basis of the existing eNB's configurations.

Likewise, in the case of coexistence of mode 1 and mode 2, at radio layer, the UE 230 receives the SIB message from the eNB 220 on resource pool configuration for mode 1 and mode 2 V2V pool. Via the protocol stack API, the UE 230 signals the radio layer received SIB message on mode 1 and mode 2 resource pool configurations to the application layer and then sends the application layer message to the back-end server 210.

Figure 7:
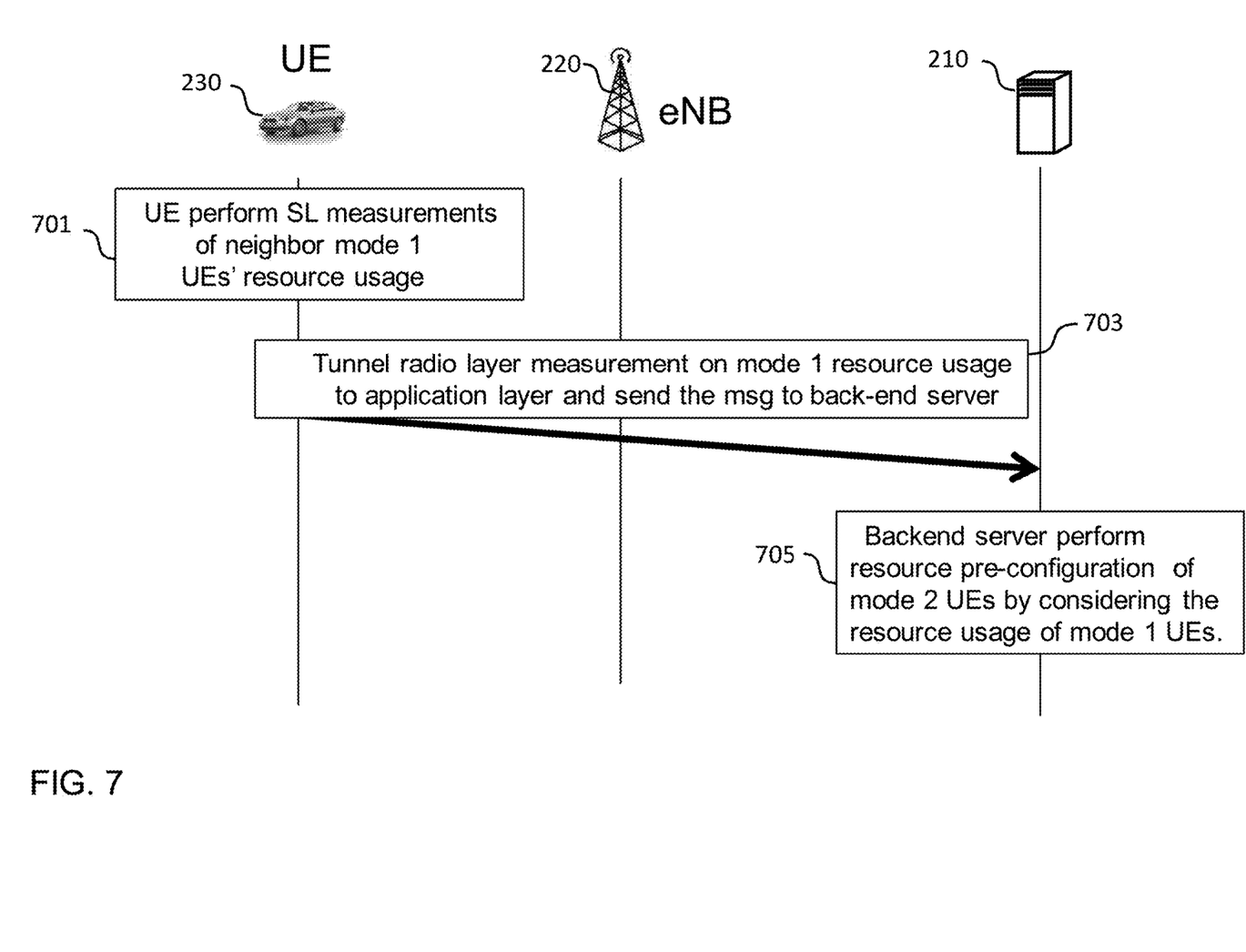
FIG. 7 shows a schematic diagram illustrating an interaction between a network entity according to an embodiment and a user equipment according to an embodiment.

FIG. 7 shows a schematic diagram illustrating a further interaction between the network entity 210 according to an embodiment and the user equipment 230 according to an embodiment. More specifically, FIG. 7 illustrates new signaling messages between the UE 210 and the V2X backend server 230 for the coexistence of mode 2 and mode 1 V2V UEs in a single shared resource pool. The critical issue in this scenario would be the mutual interference between mode 2 (supported by the V2V backend server 230) and mode 1 UEs (supported by the eNB 220). FIG. 7 shows the example where the mode 1 UEs has priority over mode 2 UEs. In this case, firstly, the mode 2 UEs perform SL measurements of neighbor mode 1 UEs' resource usage by the combination of decoding the neighbors' resource reservation messages and the measurement of the reference signal strength in the set of resource blocks in the resource pool (see block 701). Then, the UE 230 reports radio layer measurement on mode 1 resource usage to the application layer 535a and sends the message to the V2V back-end server 210 (see block 703). Thirdly, the V2V backend server 210 performs resource pre-configuration of mode 2 UEs by avoiding the resources reserved by mode 1 UEs (see block 705). Likewise, the second option is that mode 2 UEs have a higher priority than mode 1 UEs, where the eNB 220 would need to avoid the resources reserved by mode 2 UEs (configured by the V2V backend server 210) for resource allocation to mode 1 UEs.

Figure 8:
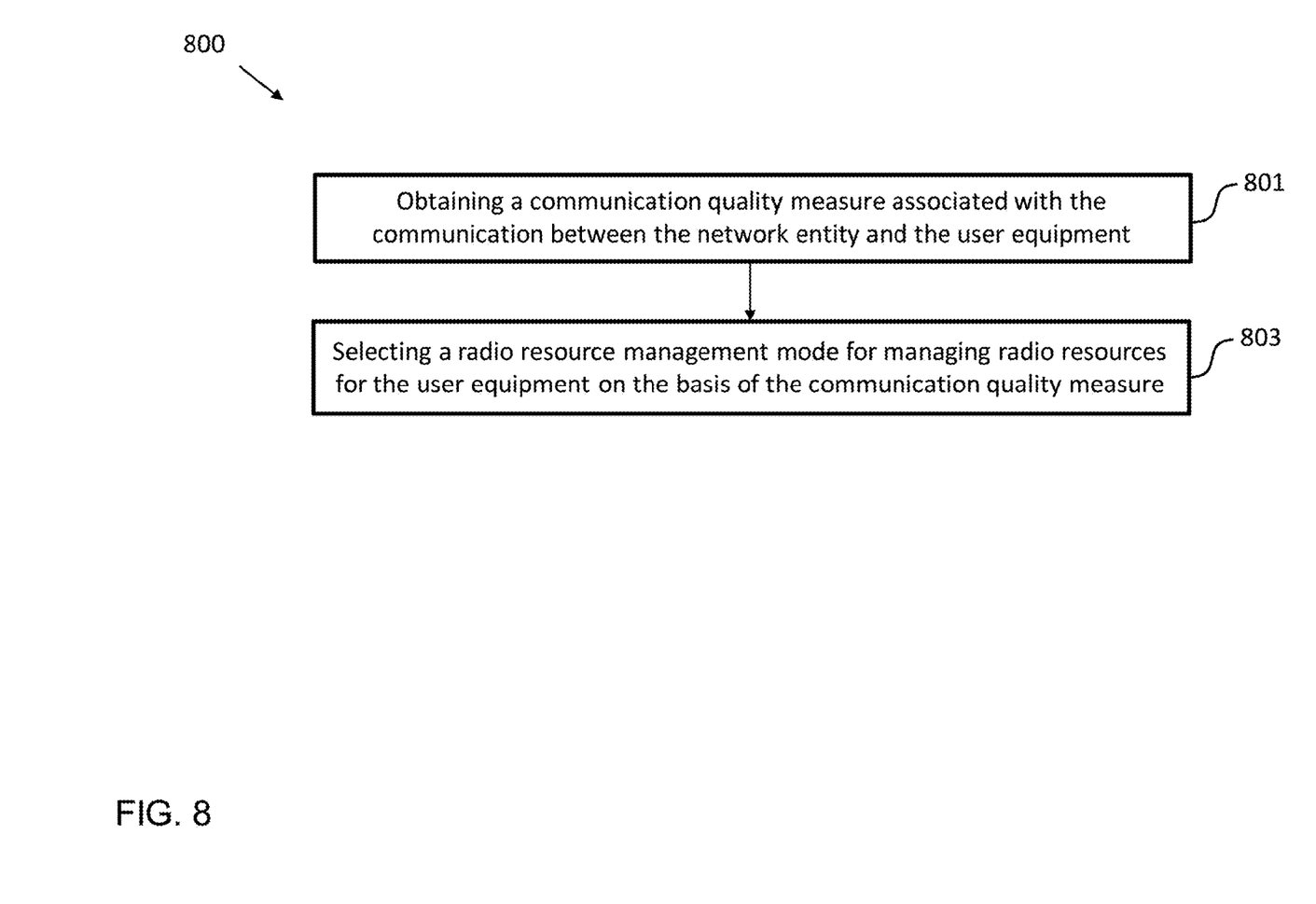
FIG. 8 shows a schematic diagram illustrating a method of operating a network entity according to an embodiment.

FIG. 8 shows a schematic diagram illustrating a method 800 of operating the network entity 210 according to an embodiment. The method 800 comprises the steps of: obtaining 801 a communication quality measure associated with the communication between the network entity 210 and the user equipment 230; and selecting 803 a radio resource management mode for the user equipment 230 on the basis of the communication quality measure.

Figure 9:
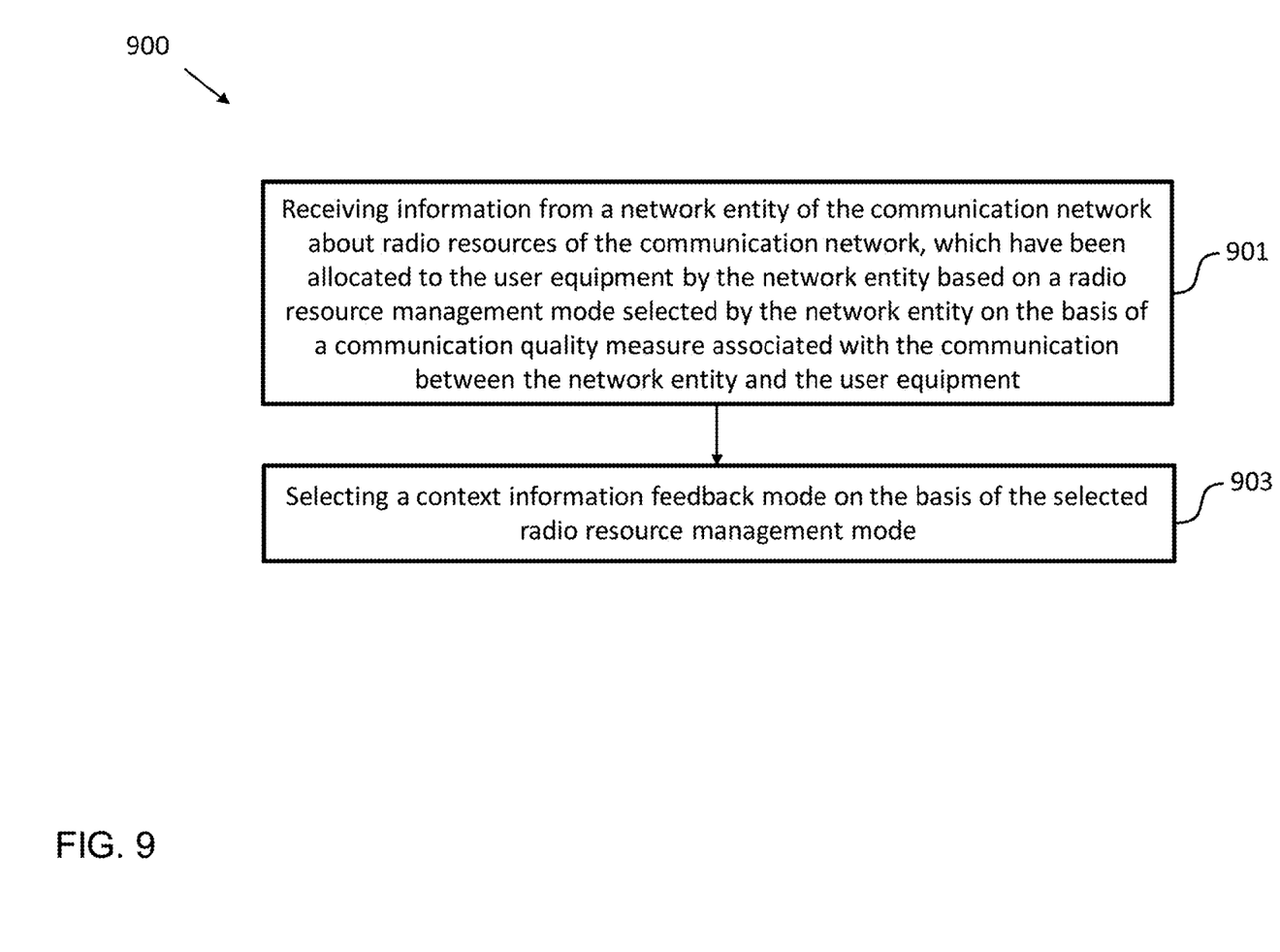
FIG. 9 shows a schematic diagram illustrating a method of operating a user equipment according to an embodiment.

FIG. 9 shows a schematic diagram illustrating a method 900 of operating the user equipment 230 according to an embodiment. The method 900 comprises the steps of: receiving 901 information from the network entity 210 of the communication network 200 about radio resources of the communication network 200, which have been allocated to the user equipment 230 by the network entity 210 based on a radio resource management mode selected by the network entity 210 on the basis of a communication quality measure associated with the communication between the network entity 210 and the user equipment 230; and selecting 903 a context information feedback mode on the basis of the selected radio resource management mode.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

What is claimed is:

1. A network entity for managing radio resources for a plurality of user equipment in a communication network, the network entity comprising:
   a communication interface configured to communicate with a user equipment of the plurality of user equipment; and
   a processor configured to:
      obtain a communication quality measure associated with the communication between the network entity and the user equipment, wherein the communication quality measure comprises a network latency measure associated with the network latency between the network entity and the user equipment; and
      select a radio resource management mode for the user equipment based on the communication quality measure,
   wherein the communication interface is further configured to receive a resource allocation request message from the user equipment,
   wherein the processor is further configured to, in response to the communication interface receiving the resource allocation request message, allocate radio resources of the communication network for the user equipment based on the selected radio resource management mode by assigning the user equipment to a subpool of radio resources based on a location of the user equipment relative to other user equipment of the plurality of user equipment, and
   wherein the communication interface is further configured transmit the allocated radio resources of the communication network to the user equipment in a resource allocation response message.

2. The network entity of claim 1, wherein the processer is further configured to inform the user equipment via the communication interface about the selected radio resource management mode.

3. The network entity of claim 1, wherein the resource allocation response message comprises one or more of the following fields: resource subpool ID, timer validity for a subpool, synchronization reference configuration for a subpool, UE transmission power level for a subpool, semi-persistent scheduling IDs for each user equipment.

4. The network entity of claim 1, wherein the resource allocation request message comprises one or more of the following: user equipment location, user equipment speed, user equipment moving direction, user equipment buffer status report, user equipment sidelink channel quality information, radio resource context information provided by a base station in communication with the user equipment.

5. The network entity of claim 4, wherein the processor is configured to select, based on the communication quality measure, a first radio resource management mode or a second radio resource management mode, wherein in the first radio resource management mode radio resources for the user equipment are allocated by the network entity and in the second radio resource management mode radio resources for the user equipment are allocated by a base station of the communication network in communication with the user equipment.

6. The network entity of claim 5, wherein the processor is configured to select, based on the communication quality measure, the first radio resource management mode for the user equipment, and, based on a further communication quality measure associated with the communication between the network entity and a further user equipment of the plurality of user equipment, the second radio resource management mode for the further user equipment.

7. A method of operating a network entity for managing radio resources for a plurality of user equipment in a communication network, the method comprising:
   obtaining a communication quality measure associated with communication between the network entity and a user equipment of the plurality of user equipment, wherein the communication quality measure comprises a network latency measure associated with the network latency between the network entity and the user equipment; and
   selecting a radio resource management mode for the user equipment based on the communication quality measure;
   receiving a resource allocation request message from the user equipment;
   allocating radio resources of the communication network for the user equipment based on the selected radio resource management mode by assigning the user equipment to a subpool of radio resources based on a location of the user equipment relative to other user equipment of the plurality of user equipment; and
   transmitting the allocated radio resources of the communication network to the user equipment in a resource allocation response message.

8. A user equipment configured for device-to-device communications with a plurality of user equipment in a communication network using a plurality of radio resources, the user equipment comprising:
   a communication interface configured to receive information from a network entity of the communication network about radio resources of the communication network, which have been allocated to the user equipment by the network entity based on a radio resource management mode selected by the network entity based on a communication quality measure associated with the communication between the network entity and the user equipment, wherein the communication quality measure comprises a network latency measure associated with the network latency between the network entity and the user equipment; and
   a processor configured to select a context information feedback mode based on the selected radio resource management mode.

9. The user equipment of claim 8, wherein the processor is configured to send, in response to the information about the radio resource management mode selected by the network entity, a resource allocation request message to the network entity.

10. The user equipment of claim 9, wherein depending on the selected context information feedback mode, the resource allocation request message comprises one or more of the following: user equipment location, user equipment speed, user equipment moving direction, user equipment buffer status report, user equipment sidelink channel quality information, radio resource context information provided by a base station in communication with the user equipment.

11. The user equipment of claim 10, wherein the processor is configured to implement a protocol stack comprising an application layer and a radio layer, wherein the application layer is configured to forward the information from the network entity about the radio resources of the communication network, which have been allocated to the user equipment by the network entity, to the radio layer.

12. The user equipment of claim 11, wherein the radio layer is configured to forward information for the resource allocation request message to the application layer.

13. A method of operating a user equipment configured for device-to-device communications with a plurality of user equipment in a communication network using a plurality of radio resources, the method comprising:
   receiving information from a network entity of the communication network about radio resources of the communication network, which have been allocated to the user equipment by the network entity based on a radio resource management mode selected by the network entity based on a communication quality measure associated with the communication between the network entity and the user equipment, wherein the communication quality measure comprises a network latency measure associated with the network latency between the network entity and the user equipment; and
   selecting a context information feedback mode based on the selected radio resource management mode.

14. A non-transitory computer readable medium storing instructions for operating a network entity for managing radio resources for a plurality of user equipment in a communication network, the instructions, when executed by a processor of the network entity, configure the network entity to perform a method comprising:
   obtaining a communication quality measure associated with communication between the network entity and a user equipment of the plurality of user equipment, wherein the communication quality measure comprises a network latency measure associated with the network latency between the network entity and the user equipment; and
   selecting a radio resource management mode for the user equipment based on the communication quality measure;
   receiving a resource allocation request message from the user equipment;
   allocating radio resources of the communication network for the user equipment based on the selected radio resource management mode by assigning the user equipment to a subpool of radio resources based on a location of the user equipment relative to other user equipment of the plurality of user equipment; and
   transmitting the allocated radio resources of the communication network to the user equipment in a resource allocation response message.

\* \* \* \* \*